US012005357B2

(12) United States Patent
Tieger et al.

(10) Patent No.: US 12,005,357 B2
(45) Date of Patent: *Jun. 11, 2024

(54) SYSTEMS AND METHODS FOR CONTROLLING CAMERA MOVEMENTS BETWEEN STORYLINES IN A VIDEO GAME

(71) Applicant: Activision Publishing, Inc., Santa Monica, CA (US)

(72) Inventors: Matthew Tieger, Valley Center, CA (US); Matthew Duncan, Palomar Mountain, CA (US); John Philippe Wetmiller, Oceanside, CA (US); Matthew John Krystek, San Diego, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/654,839

(22) Filed: Mar. 15, 2022

(65) Prior Publication Data

US 2022/0274016 A1 Sep. 1, 2022

Related U.S. Application Data

(63) Continuation of application No. 16/284,234, filed on Feb. 25, 2019, now Pat. No. 11,305,191.
(Continued)

(51) Int. Cl.
*G07F 17/32* (2006.01)
*A63F 13/5258* (2014.01)
(Continued)

(52) U.S. Cl.
CPC .......... *A63F 13/5258* (2014.09); *A63F 13/86* (2014.09); *G06T 19/003* (2013.01); *A63F 2300/5533* (2013.01)

(58) Field of Classification Search
CPC ................. A63F 13/5258; A63F 13/86; A63F 2300/5533; G06T 19/00; G06T 19/003
See application file for complete search history.

(56) References Cited

U.S. PATENT DOCUMENTS 5,530,796 A 6/1996 Wang
5,561,736 A 10/1996 Moore
(Continued)

FOREIGN PATENT DOCUMENTS

AU 768367 3/2004
AU 2005215048 10/2011
(Continued)

*Primary Examiner* — Justin L Myhr
(74) *Attorney, Agent, or Firm* — Novel IP

(57) ABSTRACT

In a multiplayer video game, virtual cameras are controlled by continually assessing and ranking storylines relating to the interactions of various players during a game session. A ranking for each storyline may be based on various factors such as, but not limited to, what the players can see, the distance between certain players, nearby game items or in-game. Subsequently, at least one virtual camera is navigated to provide a view of the highest-ranking storyline, subject to certain limitations on how the camera can move, transition, or otherwise display the interactions between players.

18 Claims, 4 Drawing Sheets

Related U.S. Application Data

(60) Provisional application No. 62/783,147, filed on Dec. 20, 2018.

(51) Int. Cl.
*A63F 13/86* (2014.01)
*G06T 19/00* (2011.01)

(56) References Cited

U.S. PATENT DOCUMENTS

| | | |
|---|---|---|
| 5,563,946 A | 10/1996 | Cooper |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,403,202 B1 | 7/2008 | Nash |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |

(56) References Cited

U.S. PATENT DOCUMENTS

| | | |
|---|---|---|
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | George |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,142,034 B2 | 9/2015 | Hoof |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 10,489,986 B2 | 11/2019 | Kaifosh |
| 2004/0157662 A1* | 8/2004 | Tsuchiya ............ A63F 13/5378 463/32 |
| 2004/0176164 A1* | 9/2004 | Kobayashi ............ A63F 13/45 463/30 |
| 2004/0224761 A1* | 11/2004 | Nishimura ............ A63F 13/45 463/33 |
| 2005/0009602 A1* | 1/2005 | Nishimura .......... A63F 13/5258 463/30 |
| 2006/0246968 A1* | 11/2006 | Dyke-Wells ......... A63F 13/10 463/2 |
| 2009/0113448 A1 | 4/2009 | Smith |
| 2009/0135187 A1 | 5/2009 | Lee |
| 2009/0262112 A1* | 10/2009 | Yoshimura ............ A63F 13/10 345/427 |
| 2010/0166056 A1* | 7/2010 | Perlman ............. H04N 19/436 375/E7.076 |
| 2014/0002580 A1* | 1/2014 | Bear .................. H04N 21/4312 348/E7.083 |
| 2014/0113718 A1* | 4/2014 | Norman .............. A63F 13/822 463/31 |
| 2014/0125576 A1* | 5/2014 | Asuke ................ A63F 13/5375 345/156 |
| 2014/0213353 A1* | 7/2014 | Lee ..................... A63F 13/30 463/31 |
| 2014/0344725 A1 | 11/2014 | Bates |

(56) References Cited

U.S. PATENT DOCUMENTS

| | | | |
|---|---|---|---|
| 2016/0191671 A1 | 6/2016 | Dawson | |
| 2017/0157512 A1* | 6/2017 | Long | A63F 13/497 |
| 2018/0161682 A1 | 6/2018 | Myhill | |
| 2019/0083885 A1 | 3/2019 | Yee | |
| 2019/0351325 A1* | 11/2019 | Spradling | A63F 13/5258 |
| 2019/0366211 A1* | 12/2019 | Suzuki | A63F 13/25 |
| 2020/0038755 A1 | 2/2020 | Kojima | |
| 2021/0093969 A1 | 4/2021 | McCoy | |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

* cited by examiner

//]: #

SYSTEMS AND METHODS FOR CONTROLLING CAMERA MOVEMENTS BETWEEN STORYLINES IN A VIDEO GAME

CROSS-REFERENCE

The present application is a continuation application of U.S. patent application Ser. No. 16/284,234, entitled "Systems and Methods for Controlling Camera Perspectives, Movements, and Displays of Video Game Gameplay", filed on Feb. 25, 2019, and issued as U.S. Pat. No. 11,305,191 on Apr. 19, 2022, which relies on U.S. Provisional Patent Application No. 62/783,147, of the same title and filed on Dec. 20, 2018, for priority. The above applications are hereby incorporated by reference in their entirety.

FIELD

The present specification is related generally to the field of multiplayer online gaming. More specifically, the present specification is related to systems and methods for selectively controlling camera perspectives, movements and/or displays of video game gameplay, thereby enabling the distribution of interesting game play for managed viewing by a plurality of spectators.

BACKGROUND

Multiplayer online gaming has seen explosive proliferation across the globe among a wide range of age groups. Similar to popular competitive sports, such as soccer, football, card games and basketball, multiplayer online games also have a large fan following who relish watching competitive online games and highly skilled players in action.

Consequently, the continued evolution and growth of online gaming, together with an ever-increasing fan base, have led to the rise in popularity of video games as an in-person spectator sport or a virtual spectator sport. As with other sports, such fans enjoy being spectators of highly competitive games or games that popular players are participating in, either online or live, as is the case with organized tournaments. In a multiplayer online game, spectators may watch one or more players or teams of players involved in combat or otherwise participating in game play. Multiplayer online games may involve a large number of players in a game session.

For example, games may support hundreds or thousands of active players including but not limited to simple two-dimensional shooting games, multiplayer online battle arena games, and massive multiplayer online role-playing games.

Existing video games enable spectators to view interesting moments of game play across a plurality of game events which develop as a result of a large number of player interactions or actions. However, conventionally, only one or more virtual cameras are configured in a video game to capture game play action. A virtual camera is an in-game object that, when executed in a video game, generates a visual, displayable viewpoint of the game that is a function of a) the programmed field of view of the virtual camera and b) the location of the in-game object, as defined by a three dimensional coordinate in a virtual game map. Those cameras are limited, however, in how they follow, track, and display game play action, often missing the most interesting interactions between players and failing to present a smooth transition between different camera angles.

Accordingly, there is a need for video game systems and methods that more effectively control camera perspectives, and manage camera transitions and displays, to ensure spectators have access to game events that are likely to be of high interest and/or entertainment value to the spectators. There is also a need for systems and methods for capturing and broadcasting interesting gameplay events in a realistic, real-world manner without detracting from the viewing experience of the spectators.

SUMMARY

The following embodiments and aspects thereof are described and illustrated in conjunction with systems, tools and methods, which are meant to be exemplary and illustrative, and not limiting in scope. The present application discloses numerous embodiments.

The following specification discloses a computer-implemented method of controlling at least one of a navigation, positioning or orientation of a virtual camera configured to capture a plurality of storylines in a multiplayer video game for broadcasting to at least one computing device, said method comprising: defining, in at least one server remote from the at least one computing device, a function to identify the plurality of storylines; defining, in the at least one server, at least one base criterion for ranking each of the plurality of storylines; determining, in the at least one server, a base rank for each of the plurality of storylines, the base rank being a function of said at least one base criterion; defining, in the at least one server, at least one factor to weight the base rank, said at least one factor having a predetermined value; determining, in the at least one server, an overall rank for each of the plurality of storylines by associating said at least one factor with the base rank, wherein the overall rank is determined at a predetermined frequency in the game; subject to one or more rules, programmatically moving, in the at least one server, the virtual camera to capture one of the plurality of storylines determined to have a highest overall ranking among the plurality of storylines; and broadcasting, from the at least one server to the at least one computing device, the one of the plurality of storylines determined to have a highest overall ranking among the plurality of storylines.

Optionally, the function is dependent on at least a genre of said multiplayer video game.

Optionally, the at least one server is configured to concurrently broadcast to at least 20 computing devices.

Optionally, the at least one base criterion comprises a virtual distance of each player with respect to each other player in the multiplayer video game.

Optionally, the base rank for each of the plurality of storylines is inversely related to the virtual distances of each player with respect to each of the other players.

Optionally, the at least one factor is a function of at least one of: a first value representative of a relationship between each player and each other player in the multiplayer video game; a second value representative of an orientation of each player relative to each other player in the multiplayer video game; or a third factor representative of a degree of an unobstructed view between each player and each other player in the multiplayer video game.

Optionally, the one or more rules limit a time which the virtual camera must take to travel to capture the storyline determined to have the highest overall ranking and wherein the time ranges between 0.25 to 1 second.

Optionally, the one or more rules limit at least one of rotation, tilt or pan required for the virtual camera to capture the storyline determined to have said highest overall ranking.

Optionally, the one or more rules require the highest overall ranking of the storyline to exceed an overall ranking of an immediately preceding storyline by a predefined value.

Optionally, the one or more rules limit at least one of a speed of movement of the virtual camera or an angular speed of rotation of the virtual camera.

The present specification also discloses a system for controlling at least one of a navigation, positioning or orientation of a virtual camera configured to capture a plurality of storylines in a multiplayer video game executing on a plurality of gaming devices for broadcasting to a plurality of spectator devices, said system comprising: at least one server for hosting a game session of the multiplayer video game and to broadcast said game session to each of a plurality of spectator devices through a network; a plurality of gaming modules stored on the plurality of gaming devices remote from the at least one server and configured to enable a plurality of human players to play in the game session of the multiplayer video game; a plurality of spectator modules stored on the plurality of spectator devices remote from the at least one server and configured to enable a plurality of human spectators to view the broadcast of the game session, wherein at least a portion of the plurality of spectator modules are executing on at least a portion of the plurality of gaming devices and wherein at least a portion of the plurality of gaming modules are executing on at least a portion of the plurality of spectator devices; a processor in said at least one server, said processor executing a plurality of executable programmatic instructions to: define a function to identify the plurality of storylines; define at least one base criterion for ranking each of the plurality of storylines; determine a base rank for each of the plurality of storylines, the base rank being a function of the at least one base criterion; define at least one factor to weight the base rank; determine an overall rank for each of the plurality of storylines by associating the at least one factor with the base rank, wherein a value of the at least one factor has an increasing or decreasing effect on the overall ranking; and subject to one or more rules, programmatically moving the virtual camera to capture one of the plurality of storylines determined to have a highest overall ranking among the plurality of storylines; and broadcasting the one of the plurality of storylines determined to have a highest overall ranking among the plurality of storylines to the plurality of spectator modules.

Optionally, the at least one base criterion comprises a virtual distance of each player with respect to each other player participating in the game session.

Optionally, the base rank for each of the plurality of storylines is inversely related to the virtual distances of each player with respect to each other player.

Optionally, the at least one factor comprises at least one of: a first value representative of a relationship between each player with respect to each other player in the game session; a second value representative of an orientation of each player with respect to each other player in the game session; and a third value representative of a degree of an unobstructed view between each player and each other player in the game session.

Optionally, the one or more rules limit a time which the virtual camera must take to travel to capture the storyline determined to have the highest overall ranking and wherein the time ranges between 0.25 to 1 second.

Optionally, the one or more rules limit at least one of rotation, tilt or pan required for the virtual camera to capture the storyline determined to have the highest overall ranking.

Optionally, the one or more rules require the highest overall ranking of the storyline to exceed an overall ranking of an immediately preceding storyline by a predefined value.

Optionally, the one or more rules limit at least one of a speed of movement of the virtual camera or an angular speed of rotation of the virtual camera.

The present specification also discloses a computer readable non-transitory medium comprising a plurality of executable programmatic instructions wherein, when said plurality of executable programmatic instructions are executed by a processor in at least one server, a process for controlling navigation, positioning and orientation of a virtual camera configured to capture a plurality of storylines in a multiplayer video game for broadcasting to at least one spectator device, said plurality of executable programmatic instructions comprising: programmatic instructions, stored in said computer readable non-transitory medium, for determining a base rank for each of said plurality of storylines, said base rank being a function of at least one base criterion; programmatic instructions, stored in said computer readable non-transitory medium, for determining an overall rank for each of said plurality of storylines by associating at least one weighting factor with said base rank, wherein said overall rank is determined at a predetermined frequency in the game, and wherein said weighting factor has an accentuating or diminishing effect on the overall rank; and programmatic instructions, stored in said computer readable non-transitory medium, for switching the virtual camera to a second storyline of a second overall rank from a first storyline of a first overall rank, wherein said switching is subject to one or more rules.

Optionally, the at least one base criterion is a distance of each player with respect to every other player participating in a game match of said multiplayer video game, and wherein the base rank for each of the plurality of storylines is inversely related to the distance of each player with respect to every other player The aforementioned and other embodiments of the present shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings.

DETAILED DESCRIPTION

Figure 1:
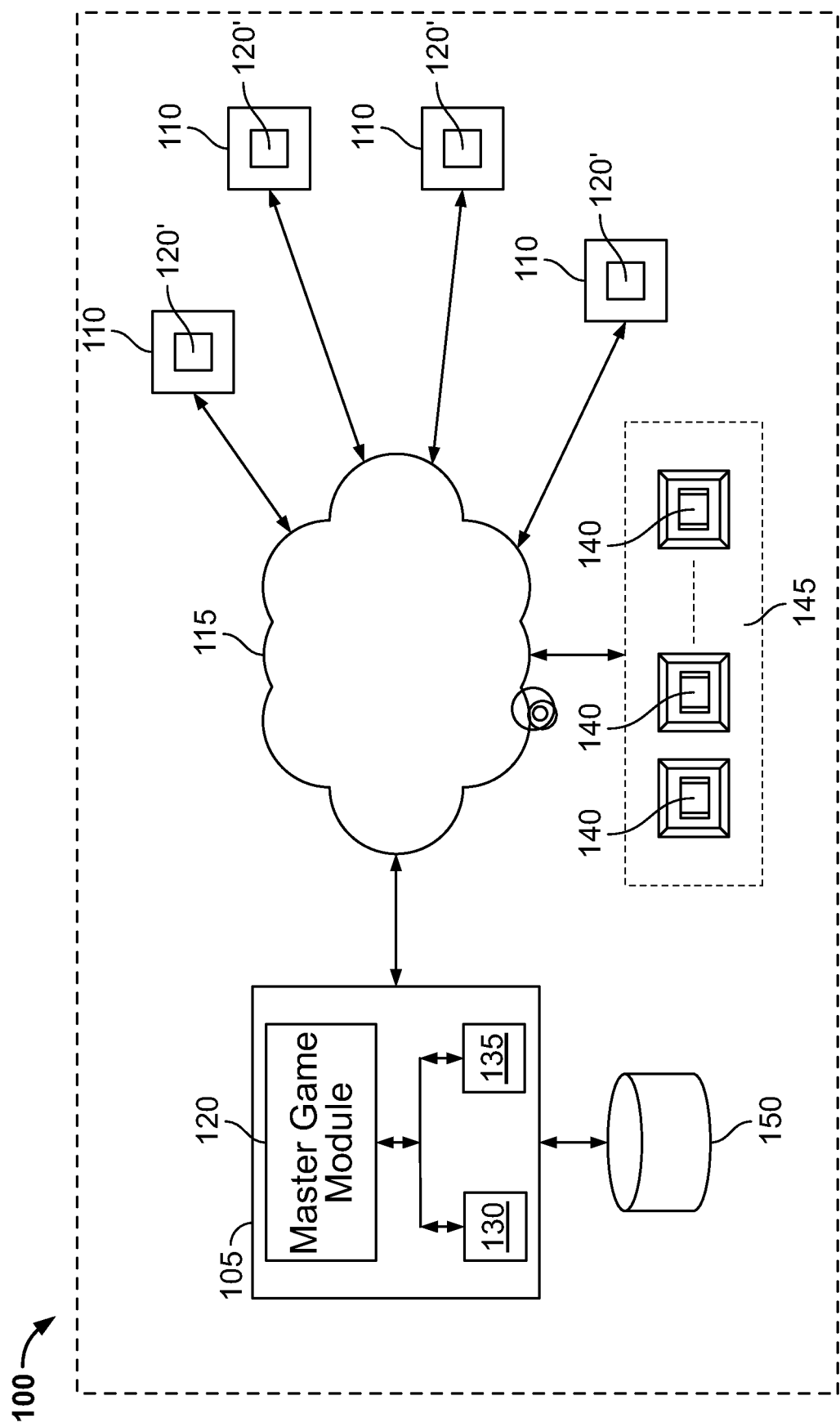
FIG. 1 illustrates an embodiment of a multiplayer online gaming system or environment in which a plurality of spectating modalities may be enabled, implemented or executed, in accordance with some embodiments of the present specification.

The present specification discloses systems and methods wherein virtual cameras are controlled by continually assessing and ranking storylines relating to various players during a multiplayer game session. In various embodiments, a ranking for each storyline may be based on a plurality of factors such as, but not limited to, what the players can see, the distance between certain players, nearby game items or in-game events in an exemplary multiplayer first person shooter (FPS) game. Subsequently, at least one virtual camera is navigated to provide a view of the highest ranking storyline, subject to certain limitations on how the camera can move, transition, or otherwise display the interactions between players.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enables or causes the CPU of the computing device to perform various functions and processes. In alternate embodiments, hardwired circuitry may be used in place of, or in combination with, software instructions for implementation of the processes of systems and methods described in this application. Thus, the systems and methods described are not limited to any specific combination of hardware and software.

The term "module" used in this disclosure may refer to computer logic utilized to provide a desired functionality, service or operation by programming or controlling a general purpose processor. In various embodiments, a module can be implemented in hardware, firmware, software or any combination thereof. The module may be interchangeably used with unit, logic, logical block, component, or circuit, for example. The module may be the minimum unit, or part thereof, which performs one or more particular functions.

The term "virtual camera" or "camera" refers to at least one viewing element configured to capture or provide a view of game play in the virtual world associated with a video game. It should be appreciated that akin to a physical camera, the at least one virtual camera may have associated position coordinates to uniquely identify its location within a gaming world. Also, in various embodiments, a virtual camera may be characterized by a plurality of customizable parameters such as, but not limited to, orientation, viewing angle, focal length, zoom factor, tilt and pan.

The term "storyline" is defined as an aggregated set of data defining a player's visual and auditory in-game interactions, e.g. with one or more other players. Storyline data may refer to all, or a portion, of the programmatic data defining the visual storyline, auditory storyline and associated metadata pertaining or incidental thereto which, if processed and rendered, would visually and aurally display the storyline to one or more human spectators. Storyline data may be indicative of one or more preferred positions, angles, foci, fields of view, or perspectives of one or more cameras.

The term "player" refers to any human or virtual actor within a game, where the human or virtual actor may engage in play actions, social actions, administrative actions, or observation actions.

The present specification is directed towards multiple embodiments. For example, the systems and methods described herein may be applied to multiplayer video games in numerous genres, including first person shooter (FPS), fighting games, survival games, action-adventure games, role-playing games, simulation games, strategy games, sports, card games, and racing games. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

FIG. 1 illustrates an embodiment of a multiplayer online gaming system or environment 100 in which a plurality of spectating modalities may be enabled, implemented or executed, in accordance with some embodiments of the present specification. The system 100, in some embodiments, comprises a client-server architecture, where one or more game servers 105 are in communication with one or more player devices 110 and one or more spectator devices 145 over a network 115. Players may access the system 100 via the one or more player devices 110 while one or more spectators or viewers may access the system 100 using the one or more spectator devices 145. The player devices 110 and the spectator devices 145 comprise computing devices such as, but not limited to, personal or desktop computers, laptops, Netbooks, handheld devices such as smartphones, tablets, and PDAs, gaming consoles and/or any other computing platform known to persons of ordinary skill in the art. Although four player devices 110 and three spectator devices 145 are illustrated in FIG. 1, any number of player and spectator devices 110, 145 can be in communication with the one or more game servers 105 over the network 115. Also, in some embodiments, the spectator devices 145 include facilities similar to Esports Arena or locations/theaters deploying large display screens to enable a number of spectators to simultaneously view a game match.

The one or more game servers 105 can be any computing device having one or more processors and one or more computer-readable storage media such as RAM, hard disk or any other optical or magnetic media. The one or more game servers 105 include a plurality of modules operating to provide or implement a plurality of functional, operational or service-oriented methods of the present specification. In some embodiments, the one or more game servers 105 include or are in communication with at least one database system 150. The database system 150 stores a plurality of game data associated with at least one game that is served or provided to the player devices 110 for game-play and to the spectator devices 145 for viewing and engagement over the network 115. In embodiments, the database system 150 also stores a plurality of data such as, but not limited to, storyline data, storyline ranking data, storyline ranking rules or logic, and/or camera movement or intelligence rules or logic. In some embodiments, the one or more game servers 105 may be implemented by a cloud of computing platforms operating together as game servers 105.

In embodiments, the one or more game servers 105 provide or implement a plurality of server-side modules such as, but not limited to, a master game engine or module 120, a storyline ranking engine or module 130 and a camera intelligence engine or module 135. In embodiments, the one or more player devices 110 and spectator devices 145 respectively provide or implement client-side modules such as, but not limited to, a player game module 120' and a spectator engagement module 140. In embodiments, the player game module 120' is same as or similar to the counterpart server-side module 120. In some embodiments, the client-side modules 120' and 140 are configured to connect and communicate with the plurality of modules on the server 105 via the network 115.

The one or more game servers 105 are preferably configured to concurrently communicate with at least 20 spectator devices, and more preferably 20 to 1,000,000 spectator devices or any increment therein, such that each of said at least 20 spectator devices are permitted to concurrently receive a broadcast of the storylines selected and recorded by a virtual camera. In another embodiment, the one or more game servers are configured to concurrently host at least 5 storyline broadcasts per second, preferably 50-150 storyline broadcasts per second, with the plurality of spectator devices.

Master Game Module 120

In embodiments, the master game module 120 is configured to execute an instance of an online game to facilitate interaction of the players with the game. In embodiments, the instance of the game executed may be synchronous, asynchronous, and/or semi-synchronous. The master game module 120 controls aspects of the game for all players and receives and processes each player's input in the game. In other words, the master game module 120 hosts the online game for all players, receives game data from the player devices 110 and transmits updates to all player devices 110 based on the received game data so that the game, on each of the player devices 110, represents the most updated or current status with reference to interactions of all players with the game and/or with one another (depending upon the type or genre of game match being played). Thus, the master game module 120 transmits game data over the network 115 to the player devices 110 for use by the game module 120' to provide local versions and current status of the game to the players.

Player Game Module 120'

On the client side, each of the one or more player devices 110 implements the game module 120' that operates as a gaming application to provide a player with an interface between the player and the game. The game module 120' generates the interface to render a virtual environment, virtual space or virtual world associated with the game and enables the player to interact in the virtual environment to perform a plurality of game tasks and objectives. The game module 120' accesses game data received from the game server 110 to provide an accurate representation of the game to the player. The game module 120' captures and processes player inputs and interactions within the virtual environment and provides updates to the game server 110 over the network 115.

Storyline and Storyline Data

As previously explained, the term "storyline" is defined as an in-game, virtual interaction between a first player and at least one other second player or actor in a multiplayer video game. A storyline therefore includes outcomes, occurrences, episodes or events, which occur in a game match and that are of value, significance, appeal, curiosity or interest to a spectator and, therefore, impact the viewership, engagement, learning and/or entertainment value of a video game.

As an example, in a multiplayer shooting or combat game a storyline may be defined as interactions/combats between each player and every other player in the match. In a two player versus two player first person shooter (FPS) game involving A, B, C and D players there may be potentially six storylines (AB, AC, AD, BC, BD, and CD). Thus, a first person shooter (FPS) game session may include x number of players thereby creating n number of storylines, with any combination or permutation of players possible. In the example provided above, a three player storyline may include ABC, ABD, ACD, or BCD.

More generally, a given multiplayer video game may have $n(n-1)/2$ number of storylines where n represents the total number of players or actors who may interact with each other in the game and where each storyline represents an interaction between two distinct players. Notwithstanding the above, the number of storylines may be modified based on a plurality of rules. For example, the system may eliminate, ignore, or otherwise filter one or more of the storylines based on whether a player or actor falls into a certain category or has a predefined characteristics, such as having a rank that is below a threshold value, having a title, label or designation that is not preferred, being on the same team as the other player with whom the storyline would be defined, having a score, point total, health level, number of kills, or amount of treasure that is below a threshold level, or having weaponry types that are not preferred. Accordingly, storylines may be filtered such that the remaining set of storylines only pertain to interactions between players on opposing teams or only to key players (such as, in a football game, quarterback, running back, or wide receiver while ignoring linemen) or players ranked in the top 10.

Storyline Ranking Engine or Module 130

The storyline ranking module 130 implements or executes a plurality of instructions or programmatic code to track one or more storylines as these are generated during a game match, acquire and store data (storyline data) associated with each of the storylines and rank each of the storylines in accordance with a plurality of pre-stored yet customizable storyline ranking logic, rules, guidelines, or imperatives. In various embodiments, the storyline data, storyline ranking data and the plurality of storyline ranking rules are stored in the database system 150.

For the purposes of illustrating the ranking functionalities and features of the module 130 the present specification refers to shooter games genre and specifically a first-person shooter (FPS) game such as, for example, Call of Duty, in accordance with some embodiments. A first person shooter (FPS) game session is now considered, as an example, where Team Alpha of first and second players is pitted in shooting combat with Team Beta of third and fourth players.

As the gameplay ensues between Team Alpha and Team Beta, a plurality of events or interactions between members of Team A and Team B unfold. In some embodiments, the plurality of storyline ranking logic, rules, guidelines or imperatives are applied such that they consider, establish or assign at least one base factor or criterion for ranking followed by at least one multiplier factor or criterion that has an accentuating or diminishing effect (on the overall ranking) depending upon the type or genre of the game.

In the first person shooter (FPS) game session, in some embodiments, a distance between two players in the game match is considered as the base criterion for ranking the storylines. In other words, the base criterion is a distance determined for each player with respect to every other player participating in the first person shooter (FPS) game session. For example, in a game map, the maximum distance between two players will be a known or fixed number, for example, 8000 units at the two farthest points in the game map. Therefore, at any given moment, any two players will be between 1 and 8000 units apart from each other. However, from the spectators' vantage points, valuable storylines are those where the two players are closer to each other because there is a greater chance of meaningful interaction.

Therefore, in some embodiments, the module 130 establishes proximity of two players as a base factor or criterion and consequently determines a base rank by inverting (that is, taking the reciprocal of) the distance between the two players in the game match. Thus, if the two players are 8000 units apart from each other the base ranking assigned to their storyline is the lowest (1/8000) whereas if the two players are 1 unit apart from each other the base ranking assigned to their storyline is the highest (1/1) in the game match. In some embodiments, the base ranking may be calculated as a percentage (1/8000=0.125%, 1/1=100%). Therefore, a storyline may be weighted using a factor that is a function of the distance between the players defining the storyline, where the function provides for a larger factor, or weight, if the players are closer to each other and a smaller factor, or weight, if the players are further away from each other.

In some embodiments, the module 130 further establishes at least one multiplier or weighting factor or criterion and assigns an accentuating or diminishing coefficient or value thereto depending upon the value (an interest or value quotient) of the multiplier or weighting factor from the vantage point of the spectators. In the first person shooter (FPS) game, in some embodiments, following exemplary multiplier factors are established by the module 130 and assigned a corresponding coefficient:

A first multiplier or weighting factor is representative of a relationship between the two players. Thus, a coefficient of, for example, "5" may be assigned if the two players are from opposing teams—that is, the two players are enemies. However, if the two players are from the same team then a coefficient of, for example "1" or any increment therein in a range 0 to 1 may be assigned. In other words, the module 130 puts more emphasis and value on storylines between opponents or foes. Therefore, a storyline may be weighted using a factor that is a function of the relationship between the players defining the storyline, where the function provides for a larger factor, or weight, if the players are in opposition to each other and a smaller factor, or weight, if the players are in cooperation with each other. Note that this, and all subsequent, weighting approaches may be used in place of eliminating or filtering out such storylines altogether, as described above.

A second multiplier or weighting factor is representative of an orientation of the two players with respect to each other. Thus, a coefficient of, for example, "2" may be assigned if each of two players (from opposing teams, each having two players) are facing each other; a coefficient of, for example, "1.5" may be assigned if only one of the two players (from opposing teams) is facing the other. However, if neither of the two players (from opposing teams) is facing the other then a coefficient of, for example "1" or any increment therein in a range of 0 to 1 may assigned. Therefore, a storyline may be weighted using a factor that is a function of the orientation between the players defining the storyline, where the function provides for a larger factor, or weight, if the players are fully or partially oriented toward each other and a smaller factor, or weight, if the players are oriented away from each other. Accordingly, the module 130 places more emphasis or weighted value on storylines between opponents/foes/enemies where at least one player is facing the other thereby indicative of a possible combat event. In some embodiments, the second multiplier or weighting factor is also indicative of whether the virtual camera can establish a position and/or orientation where both players are visible.

A third multiplier or weighting factor is representative of what the two players can "see" or have in their field of view (FOV). Thus, a coefficient of, for example "2" may be assigned if the player (that the virtual camera is closest to) can actually see the other player without any obstructions in the view (that is, an unobstructed view).

Thus, in some embodiments, a base ranking determined from a base criterion, such as the proximity of two players, when multiplied by one or more coefficients determined from one or more multiplier factors provides an overall ranking of a storyline between the two players, as follows:

$$R = k_1 \times (b_r) + k_2 \times (b_r) + \ldots + k_n \times (b_r),$$

where R is the overall ranking of a storyline between two players, $k_1$ to $k_n$ are coefficients corresponding to 'n' number of multiplier factors and $b_r$ is the base ranking determined established on a base factor/criteria. In various embodiments, the value of the coefficients may be real numbers ranging between 0 and 1 ($0 \leq$ coefficient $\leq 1$) corresponding to multiplier factors that have diminishing effects (that is, are low in terms of value for spectators) and may be real numbers greater than 1 ($1 \leq$ coefficient) corresponding to multiplier factors that have accentuating or emphasizing effects (that is, are high is terms of value for spectators).

In the first person shooter (FPS) game example of Team Alpha and Team Beta, in accordance with the base and multiplier criteria, module 130 is programmed to value conflict and combat. Also, it should be appreciated that the base and multiplier factors or criteria are customizable by an administrator. That is, the plurality of rules or logic implemented by the module 130, to determine the storyline rankings, may be expanded or relaxed/briefed depending on factors such as, but not limited to, game mode, type, genre, and/or level. For example, in some embodiments, the module 130 generates the overall storyline ranking not only on the basis of player relationships (the first multiplier factor) but also other criteria such as, but not limited to a) locations of interest on a game map (for example, storylines taking place in the center of the game map, a particular building, and/or on a bridge may be ranked higher or lower depending upon the perceived value for the spectators), and b) certain virtual items or combat gear of interest to spectators (such as, vehicles, combat weapons, positions of advantage in terms of first strike).

In some embodiments, the module 130 implements a plurality of instructions or programmatic code to acquire storyline data and generate storyline rankings (also referred to as 'storyline ranking data') in real-time or near real-time as the storylines develop between the players during the game map. In such embodiments, the game match is available for spectating in real-time during the game match. Accordingly, a first plurality of rules (such as those described above) are used by the module 130 to establish the base and multiplier factors in order to determine the overall ranking of the storylines in real time.

However, in some embodiments, the module 130 implements a plurality of instructions or programmatic code to acquire storyline data and generate storyline rankings when the game match is broadcasted for spectating with time delay or after the match is complete. Accordingly, a second plurality of rules are used by the module 130 to establish the base and multiplier factors in order to determine the overall ranking of the storylines. For example, if the match is already complete the second plurality of rules enable the module 130 to assess and rank storylines with the benefit of already knowing their outcome. For example, a particular interaction between two players of opposing teams that seemed mundane in the beginning may lead to a very exciting or game-defining battle towards the end of the match. With the known outcome, the second plurality of rules enable the module 130 to assign an overriding high ranking to this match. Such second plurality of rules includes assigning a greater weighting value to the player or players who achieved the highest score, number of kills, wins, or rank, thereby increasing the ranking of storylines involving those players, assigning a greater weighting value to the player or players who are positioned in a particular location which experienced interesting gameplay, thereby increasing the ranking of storylines involving that location and/or assigning a greater weighting value to the player or players who participated in the most interesting gameplay action.

In embodiments, the module 130 continuously or pseudo-continuously evaluates all relevant storylines for rankings depending upon at least the complexity of the game. In some embodiments, the module evaluates or determines the rankings of all relevant storylines at a frequency or refresh-rate of 't' times per second. In some embodiments, the value of 't' varies from 1 to 60 times per second. In some embodiment, a refresh occurs on a frame-by-frame basis. In another embodiment, a refresh occurs every second. In an embodiment, the frequency of storyline evaluation for ranking generation is 4 times per second. It should be appreciated that in embodiments, the refresh-rate is also a function of the available processing power at the spectator devices 145. For example, a gaming console may be able to render storylines, commensurate with updated rankings, more frequently than a mobile device. Accordingly, the refresh-rate may be programmatically modified based upon the processing power of the client device where a lower refresh-rate is implemented with a lower processing power and a higher refresh-rate is implemented with a higher processing power.

Persons of ordinary skill in the art should appreciate that the base factor and multiplier factors may differ across game genres, modes and/or levels. For example, in multiplayer platform games (where a plurality of players controls their corresponding characters or avatars to jump between suspended platforms and avoid obstacles) the base factor may be an advance level that has been reached in the game by a player and/or a threshold number of points amassed by a player. Again, in multiplayer adventure games (where a plurality of players assume the role of protagonists in an interactive story driven by exploration and puzzle-solving instead of physical challenge) the base factor may be an advance level of difficulty that has been reached in the game by a player. Yet again, in strategy games such as multiplayer online battle arenas or MOBAs (that are a hybrid of action games, real-time strategy and role-playing video games where the objective is for the player's team to destroy the opposing side's main structure with the help of periodically spawned computer-controlled units that march towards the enemy's main structure) the base factor may be a team of players occupying or destroying key sub-structure(s) of the opposing team's main structure, hideout or fort.

It should be appreciated that the module 130 communicates the determined overall storyline rankings to the camera intelligence module 135 and also stores the rankings in the database system 150.

Figure 2:
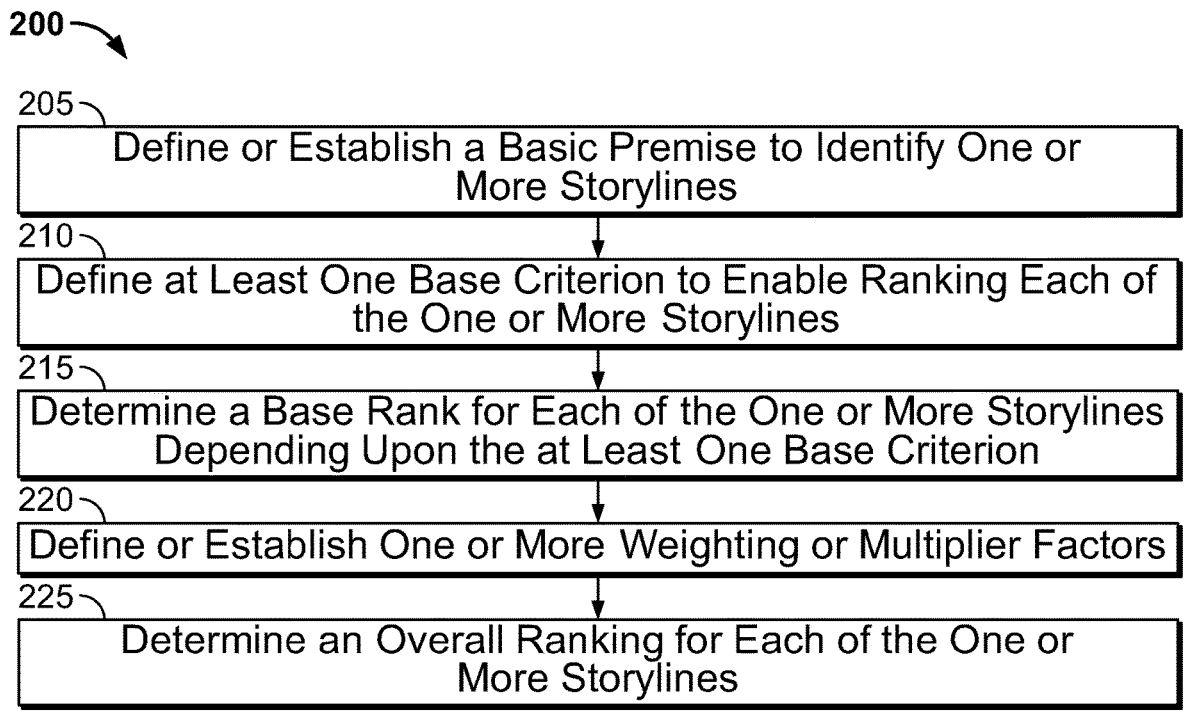
FIG. 2 is a computer-implemented method of tracking and ranking one or more storylines in a game match of a multiplayer online video game, in accordance with some embodiments of the present specification.

FIG. 2 is a computer-implemented method 200 of tracking and ranking one or more storylines in a game match of a multiplayer online video game, in accordance with some embodiments of the present specification. In embodiments, the method 200 is implemented by the storyline ranking module 130. Referring now to FIGS. 1 and 2, at step 205, a premise or principle, collectively referred to as a function, is defined or established to identify the one or more storylines, depending upon at least the genre, type or level of the multiplayer online video game. For example, in some embodiments, for a first person shooter (FPS) genre, the basic premise pertains to combative interactions amongst a plurality of players participating in the multiplayer video game.

At step 210, at least one base criterion is defined or established to enable ranking each of the one or more storylines. For example, in a first person shooter (FPS) game session, the at least one base criterion is a distance of each player with respect to every other player participating in said multiplayer video game. Accordingly, position coordinates (within the game map) of each player are acquired and distances of each player with respect to every other player are calculated based on the positional coordinates. At step 215, depending upon the at least one base criterion a base rank is determined for each of the one or more storylines. In various embodiments, the base rank is a function of the at least one base criterion. For example, if a distance (base criterion) between any two players in the first person shooter (FPS) game session is 'D' units, then the corresponding base rank for the storyline associated with the two players is determined to be a reciprocal of the distance—that is, the base rank is 1/D points.

At step 220, one or more weighting or multiplier factors are defined or established. In embodiments, the one or more weighting factors have predetermined values. In some embodiments, the one or more weighting factors comprise a first factor representative of a relationship between each player with respect to every other player in the game match, a second factor representative of an orientation of each player with respect to every other player and a third factor representative of obstructed or unobstructed view between each player with respect to every other player.

Finally, at step 225, an overall ranking for each of the one or storylines is determined by associating the one or more weighting factors with the base rank. In some embodiments, the base rank is multiplied by each of the one or more weighting factors to calculate a weighted sum representative of the overall ranking. In various embodiments, the weighting factors have accentuating or diminishing effect on the overall ranking of the one or more storylines. In various embodiments, the overall rank is determined at a predetermined frequency in the game match.

It should be appreciated that while executing the method 200, the module 130 continuously stores and/or updates data related to the basic premise, base criterion, position coordinates and distances of each player with respect to every other player, base rank, one or more weighting factors and the overall ranking, for each of the one or more storylines, in the database system 150.

Camera Intelligence Engine or Module 135

The camera intelligence module 135 implements a plurality of instructions or programmatic code to control a virtual camera so as to enable adaptive or intelligent navigation, positioning and viewing orientation of the virtual camera in response to dynamic rankings of storylines determined in real-time during a game match or offline after completion of the game match. In embodiments, the virtual camera generates video output of at least one storyline in a game match for broadcasting over the network 115 for viewing or spectating at the spectator devices 145.

In accordance with an aspect of the present specification, the camera intelligence module 135 considers a spectator as a pseudo-player in the game match, assigns the pseudo-player's camera entity to an invisible game object (that is, the virtual camera) which is thereafter manipulated like any other game object through a plurality of instructions or programmatic code for navigation, positioning and orientation.

In some embodiments, the module 135 is programmed to receive overall rankings of storylines from the storyline ranking module 130 or access the overall rankings from the database system 150 and in response automatically navigate the virtual camera to capture and broadcast the storyline with the highest ranking at any given point in time. However, in embodiments, this navigation of the virtual camera is constrained, bound or governed by a plurality of pre-stored (in the database system 150) yet customizable camera intelligence rules, logic or imperatives. In accordance with aspects of the present specification, the plurality of camera intelligence rules or logic is configured to avoid situations where the virtual camera is too frequently alternating between storylines that have oscillating rankings. Therefore, the plurality of camera intelligence rules or logic are aimed at intelligently navigating the camera while setting certain limitations on how far and frequently the camera can change storylines. In some embodiments, the camera navigation limitations are set with reference to the following exemplary parameters.

A first parameter relates to a travel distance of the camera as the module 135 evaluates whether it should move to a new storyline (both in the horizontal and vertical directions). For example, in some embodiments, the camera is allowed to move from one storyline to another if the travel distance for switching the storyline can be traversed within a predefined time range of 0.25 to 1 second. In an embodiment, the camera is allowed to move from one storyline to another if the travel distance for switching the storyline can be traversed in 0.5 seconds or less. In some embodiments, the camera is allowed to switch from first to second storyline by traveling a distance that requires a traveling time of greater than 1 second if a ranking difference between the first and second storylines is a spectrum of values lying between a lower end and a higher end point value. In some embodiments, the lower end point value is a first sliding scale ranging from 0.9 to 2 (with incremental values of 0.1). In an embodiment, the lower end point value is preset at 1 point by default. In some embodiments, the higher end point value is a second sliding scale ranging from 2 to 5 (with incremental values of 0.1). In an embodiment, the higher end point value is preset at 3 points by default. Thus, in some embodiments, the camera is allowed to switch if the ranking difference between the first and second storylines ranges from 1 to 3 points or is otherwise confined to a predefined range of less than a predefined value and not allowed to switch if the ranking difference exceeds the predefined value. However, as mentioned earlier, the lower end of this range may vary in accordance with the first sliding scale while the upper end of this range may vary in accordance with the second sliding scale. It should be appreciated that lower values within the first sliding scale results in the camera switching more frequently between storylines. On the other hand, higher values within the first sliding scale results in the camera being more "sticky" and preferring to remain focused with a storyline. Accordingly, the virtual camera is programmed to switch at a speed or rate that is dependent upon a first sliding scale, wherein the first sliding scale is indicative of a ranking difference between storylines. In some embodiments, a value for the lower end of the spectrum automatically resets towards higher values of the first sliding scale after the virtual camera changes focus or switches from the first to the second storyline, thereby insuring the virtual camera does not switch storylines too rapidly. Therefore, after the virtual camera switches in accordance with a first value of the first sliding scale, that first value is reset to a second value that will cause the virtual camera to switch at a slower rate than the first value.

A second parameter relates to how much the camera can rotate, tilt and/or pan. For example, in some embodiments, the camera is allowed to rotate at a predetermined angular speed and acceleration. Accordingly, the virtual camera is programmed to rotate, tilt and/or pan at a scale or speed that is constrained to a predetermined set of threshold values, thereby insuring the virtual camera does not present an excessively jarring view. For example, the virtual camera may be constrained to rotate, tilt or pan less than 45 degrees, 90 degrees, 135 degrees, 180 degrees, 225 degrees, 270 degrees, 315 degrees, 360 degrees, or some increment therein.

A third parameter relates to a predetermined (yet customizable) ranking threshold. For example, a second storyline ranking must exceed a first storyline ranking by at least 'x' number of points for the camera to be switched from the first to the second storyline. That is, a new storyline must be ranked 'x' number of points better than the existing storyline for the module 135 to switch the camera. In various embodiments, 'x' is at least 1 number of points, although one of ordinary skill in the art would appreciate that the precise units used may vary depending on the scale being used.

A fourth parameter relates to establishing a predefined boundary or 'sandbox' beyond which the virtual camera is not permitted to be moved or relocated. In one embodiment, module 135 defines a boundary, defined in terms of three-dimensional coordinates of a virtual map, around the coordinate location of the virtual camera. If, as a result of selecting a new storyline to broadcast, module 135 determines a virtual camera's position should be redefined to a new coordinate location that is outside the boundary, the virtual camera will be positioned at a coordinate point on the boundary that is closest to the new coordinate location but not external to that boundary. Accordingly, upon determining a new storyline and therefore a new position for the virtual camera, module 135 compares the coordinates of the new position against the coordinates of the predefined boundary and determines if the coordinates of the new position are outside the coordinates of the predefined boundary. If the coordinates of the new position are outside the coordinates of the predefined boundary, the module 135 determines coordinates on the predefined boundary that are closest to, or representative of, the coordinates of the new position. If the coordinates of the new position are inside the coordinates of the predefined boundary, the module 135 moves the virtual camera to the coordinates of the new position.

Before describing the fifth parameter, it should first be appreciated that, during the above described transitions from one virtual camera position to another virtual camera position, the virtual camera remains on, thereby continuously displaying the surrounding visual and auditory elements of the video game as it moves from the first virtual camera position, angle, tilt, field of view or focus to the second virtual camera position, angle, tilt, field of view or focus. However, there are situations where the second position is so far from the first position or situations where getting to the second position from the first position requires passing through such a contorted path that continuously displaying the surrounding visual and auditory elements of the video game as it moves from the first virtual camera position to the second virtual camera position would take too long, require moving too fast, and/or would require moving in a jarring manner.

In such situations, a fifth parameter, which may be implemented in place of the fourth parameter, establishes a predefined boundary or 'sandbox' beyond which the virtual camera would "teleport" from a first current position within the boundary to a second future position outside the boundary. The view of the virtual camera first momentarily fades to black (fadeout) upon leaving the first position and then fades to the new view (fade-in) when at the second position. Accordingly, module 135 may implement the teleport function when the module 135 determines the distance or pathway between a first position and a second position is too great, or too contorted, such that the speed the camera would have to adopt to get to the new viewpoint in a standard camera transition time would create a video sequence too jarring and/or disorienting for viewers, possibly causing motion sickness in viewers. In such a case, the teleport function fades the viewer's view to black (fade-out), instantly moves the camera to the new viewpoint, and then fades the viewer's view back in from black (fade-in), thereby not continuously displaying the surrounding visual and auditory elements of the video game as it moves from the first virtual camera position, angle, tilt, field of view or focus to the second virtual camera position, angle, tilt, field of view or focus. In some embodiments, the module 135 teleports the virtual camera when 1) the module 135 determines there is obstructive geometry or other visual hazards between a first position and a second position or the pathway is otherwise too contorted, 2) module 135 determines to jump-cut between multiple cameras responsible for covering different subset-volumes of a playing field, or 3) the module 135 determines to reset a poorly-performing camera.

It should be appreciated that the parameters are only exemplary and in no way exhaustive and therefore may be expanded or relaxed by the administrator as per need. Thus, the plurality of camera intelligence rules or logic implements the aforementioned exemplary parameters to determine 'when' the module 135 should navigate/move the camera between storylines in a game match.

In accordance with aspects of the present specification, the plurality of camera intelligence rules or logic also determines 'how' the module 135 should navigate/move the camera between storylines in a game match. In some embodiments, rather than a traditional overhead, third-person, or first-person view of the storylines, the module 135 enables navigation, positioning and viewing orientation of the virtual camera such that to the spectators it appears as if the virtual camera is being operated on a drone or by a live cameraman. The module 135 achieves this effect by enabling the virtual camera to navigate as if the camera is trying to move, position and orient itself to get an ideal shot of a storyline; however the camera has programmatically imposed limitations that mimic real-world like conditions or constraints in how it can navigate, thereby preventing it from being able to always get into position to record an ideal shot (similar to a real drone or cameraman trying to capture the storyline). In some embodiments, an ideal shot corresponds to moving, positioning and orienting the camera such that two players (from opposing teams) in the first person shooter (FPS) game session are directly in view along an imaginary center vertical line of the game display area/screen. In some embodiments, an ideal shot corresponds to moving, positioning and orienting the camera for focusing on a center point of an imaginary line drawn between the two players. In some embodiments, an ideal viewing position and orientation of the camera is one that further includes as many other players as possible.

In embodiments, the module 135 acquires positions of the two players, defined in terms of three dimensional coordinates in a virtual map, as well as that of a point midway, also referred to as a center point, on an imaginary ray joining the positions of the two players. In some embodiments, the module 135 is programmed to cause the virtual camera to adopt a position close to the nearest player, with reference to a current position of the virtual camera at any given point in time, within the storyline associated with the two players. The module 135 is further programmed to cause the virtual camera to offset from the nearest player's position in a direction away from the other player and the center point, so that all three dimensional coordinates related to interactions occurring in the storyline, are dimensionally located on a single side of the virtual camera. This ensures that all coordinates or points, relevant to the storyline, are in frame. From that location, the virtual camera is allowed to rotate to point towards the center point.

For example, assuming two players are positioned at points A and B, defined by coordinates (X1, Y1, Z1) and (X2, Y2, Z2), respectively, in the virtual game map and further assuming a virtual camera is already positioned at a coordinate that is closer to player B (X2, Y2, Z2) than player A (X1, Y1, Z1), then the module 135 causes the virtual camera to move to, or be assigned to, a three dimensional coordinate such that 1) the virtual camera is closer to player B than player A, 2) both players A and B are located on one side (right, left, below, above) of the virtual camera and 3) the virtual camera is offset from the position of player B by a predefined orientation and/or distance.

In embodiments, at least the following factors are considered when determining the orientation and distance of an offset of the virtual camera from the nearest player's position: a) the offset must be by a predefined distance of units that may vary based on a game mode and b) the offset position of the virtual camera will not cause a visible game object to be positioned between the virtual camera and one or more players, thereby avoiding an obstruction or blocking of the virtual camera from obtaining a shot from the offset position. In embodiments, the system determines if one or more visible game objects is virtually positioned within the field of view of the virtual camera and if one or more visible game objects block the virtual camera's ability to see the nearest player from the predefined distance 'd', the virtual camera is re-positioned to reduce the predefined distance of units to a minimum possible distance (from the nearest player) required for an unobstructed shot.

For example, the module 135 is configured to cause the virtual camera to follow a storyline associated with the two players, A and B, such that the virtual camera is at a distance of 196 units behind and 64 units above the nearest player, and continues to follow as close as 128 units behind and 0 units above the nearest player. It should be appreciated that these distances may vary according to at least the different modes of viewing the game. For example, a longer-distance battle-royale mode may require the virtual camera to be programmed to follow the nearest player from a longer distance. While a sporting event, such as boxing, may require a shorter distance mode in which the virtual camera is programmed to follow the nearest player from a shorter distance.

In some embodiments, the module 135 enables to move, position and/or orient the camera to achieve an ideal shot less than 100% of the time. For example, an ideal shot, as defined above, occurs between 1% and 99% of the time, or any numerical increment therein, while, the remainder of time the virtual camera is programmed to provide a shot that is subject to one or more artificially applied constraints to achieve the effect of a real drone or cameraman. Module 135 is programmed to apply such artificially applied constraints in the form of one or more rules or logic that embody one or more constraining or limiting navigation parameters such as, but not limited to:

Speed of camera movement—in some embodiments, a maximum speed and acceleration of the camera is a function of a maximum speed and acceleration of the players in the first person shooter (FPS) game session. For example, in some cases the maximum speed and acceleration of the camera is same as that of the players whereas in other cases the maximum speed and acceleration of the camera are more or less than that of the players. Such variation, of the maximum speed and acceleration of the camera vis-à-vis the maximum speed and acceleration of the players, enables creation of an effect that when a player is moving slowly, the camera is able to stay right behind the action or storyline, but when the player suddenly takes off, the camera appears to lag slightly behind the action and eventually catches up when the player slows down.

Angular speed of camera rotation—in some embodiments, an angular speed or acceleration of rotation of the camera is constrained to predetermined (yet customizable) degrees per second. This limitation again enables creation of the effect that sometimes the camera is unable to capture a perfect or ideal shot, but eventually catches up to the action.

In some embodiments, the plurality of rules or logic implemented by the module 135 enable movement, positioning and/or orientation of the camera by considering a plurality of game factors such as, but not limited to, what weapon a player (in the first person shooter (FPS) game session), being followed by the camera, is holding. Thus, in embodiments, the camera is automatically navigated to stay close (to the player) if the player is holding a short range melee weapon while pulling back if the player is using a machine gun.

In some embodiments, the plurality of camera intelligence rules or logic implemented by the module 135 ensure fail safes in case the camera is no longer capturing the most interesting or highest ranking storyline but it is too undesirable to pan the camera to a new storyline (owing to the plurality of navigational limiting parameters, for example). In some embodiments, therefore, the video output of the camera is allowed to just fade to black and the camera is moved, repositioned or reoriented. In some embodiments, the plurality of camera intelligence rules or logic implemented by the module 135 performs collision detection such that the camera avoids or otherwise navigates around solid structures and objects in the level.

Figure 3:
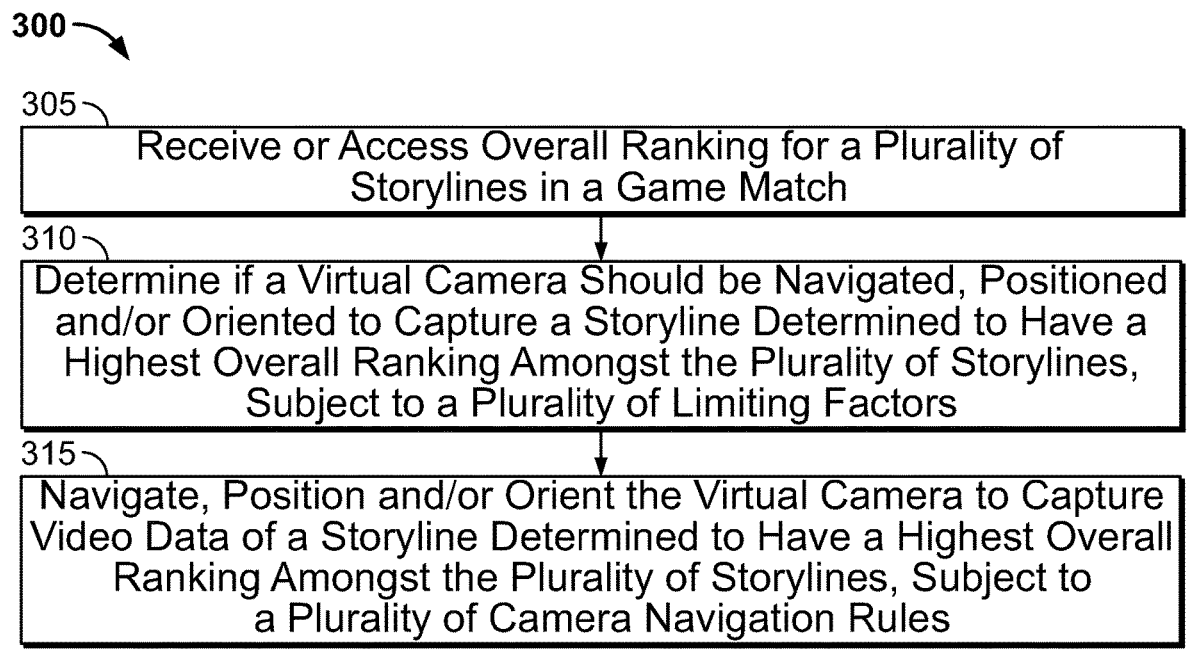
FIG. 3 is a computer-implemented method of controlling navigation, positioning and orientation of a virtual camera configured to capture a plurality of storylines in a multiplayer video game for broadcasting to at least one spectator device, in accordance with some embodiments of the present specification.

FIG. 3 is a computer-implemented method 300 of controlling navigation, positioning and orientation of a virtual camera configured to capture a plurality of storylines in a multiplayer video game for broadcasting to at least one spectator device, in accordance with some embodiments of the present specification. In embodiments, the method 300 is implemented by the camera intelligence module 135. Referring now to FIGS. 1 and 3, at step 305, the module 135 either receives from the module 130 or accesses from the database system 150, overall ranking for the plurality of storylines in a game match of the multiplayer video game.

At step 310, it is determined if the virtual camera should be navigated, positioned and/or oriented to capture a storyline determined to have a highest overall ranking amongst the plurality of storylines, subject to a plurality of limiting factors. In some embodiments, the plurality of camera navigation rules are predefined with reference to: a first parameter that limits a distance which the virtual camera must travel to capture the storyline having the highest overall ranking, a second parameter that limits at least one of rotation, tilt and pan required for the virtual camera to capture the highest overall ranking storyline and a third parameter that requires the highest overall ranking of the storyline to exceed an overall ranking of an immediately preceding storyline by a predetermined threshold number of points.

At step 315, the virtual camera is navigated, positioned and/or oriented to capture video data of a storyline determined to have a highest overall ranking amongst the plurality of storylines, subject to a plurality of camera navigation rules. In some embodiments, the plurality of camera navigation rules comprise at least one of a speed of movement, acceleration of movement, an angular speed of rotation and an angular acceleration of rotation of the virtual camera. In embodiments, the captured video data is broadcasted to one or more spectator devices 145 over the network 115.

Spectator Engagement Module 140

In embodiments, each of the one or more spectator devices 145 implements the spectator engagement module 140 that operates as a game viewing application. The module 140 implements a plurality of instructions or programmatic code to provide a spectator with at least one interface between the spectator and the video data broadcast, of a game match, received from the camera intelligence module 135. The engagement module 140 generates at least one interface to receive the video data broadcasted by the camera intelligence module 135, render the video data associated with the game match, and enable the spectator to view a plurality of viewing options. Thus, the module 140 also captures and processes spectator inputs and interactions with respect to the plurality of viewing options and provides updates to the camera intelligence module 135 over the network 115 for subsequent implementation.

In various embodiments, the engagement module 140 provides a spectator with the following exemplary viewing options:

- A GUI (Graphical User Interface) displaying a dashboard comprising information of the top 'n' ranking storylines in a game match, such as the first person shooter (FPS) game session involving Team Alpha and Team Beta. It should be appreciated that the ranking data is periodically generated by the storyline ranking module 130 and stored/updated in the database system 150. The engagement module 140 accesses the most recently updated ranking data from the database system 150 and displays on the dashboard. In some embodiments, the module 140 enables the spectator to choose any one of the 'n' ranking storylines that he would like to view. The spectator's choice of the storyline is communicated to the camera intelligence module 135 that, as a result, broadcasts the chosen storyline to the spectator's device.
- A GUI to enable a spectator to filter the storylines. For example, in some embodiments, the spectator can choose to view video data pertaining to storylines involving only x, y and z players or storylines related to only a particular team.
- A GUI to enable a spectator to request kill-cam replays during or after completion of a game match. As known to persons of ordinary skill in the art, in first person shooter (FPS) games, killcam refers to a virtual camera that reveals the way that a player was killed, displaying an instant replay of the player's own death through another player's eyes.
- A GUI that provides a spectator with a plurality of parameters to affect or control a positioning and/or viewing orientation of the virtual camera that records various storylines. In some embodiments, the plurality of parameters may include tilt and pan options of the virtual camera.
- A GUI that enables a spectator to choose a picture-in-picture (PIP) mode of viewing. In PIP mode, a first game video is displayed on the full GUI screen at the same time as a second game video is displayed in a smaller inset window. Sound is usually from the game video displayed on the full GUI screen. In some embodiments, the first and second game videos may be two different storylines or two different views of the same storyline. For example, the second game video (rendered in the small inset window) could be a view from a sniper's scope while the first game video (rendered in the full GUI screen) could be the standard storyline view of the sniper. In another example, the first and second game videos could be the two highest ranking storylines. In some embodiments, the engagement module 140 enables the spectator to toggle between the first and second game videos.

In alternate embodiments, each of the one or more spectator devices 145 implements the game module 120' configurable to operate as a game viewing application for the spectator. In accordance with alternate embodiments, the game module 120' can be operated in either a player-centric or a spectator-centric mode. When operated in the player-centric mode, the game module 120' allows all functionalities relevant for a player to interact and play the game match. However, when operated in the spectator-centric mode, the game module 120' allows all functionalities relevant for a spectator to view the game match. Thus, in spectator-centric mode, the game module 120' generates at least one interface to receive the video data broadcasted by the camera intelligence module 135, render the video data associated with the game match, enable the spectator to view the plurality of viewing options, captures and processes spectator inputs and interactions with respect to the plurality of viewing options and provides updates to the camera intelligence module 135 over the network 115 for subsequent implementation.

In further alternate embodiments, each of the one or more spectator devices 145 implements a client software application (such as, for example, the Open Broadcaster Software) that receives the video data, broadcasted by the camera intelligence module 135, via a third party video game streaming service such as, for example, Twitch or Mixer.

Figure 4:
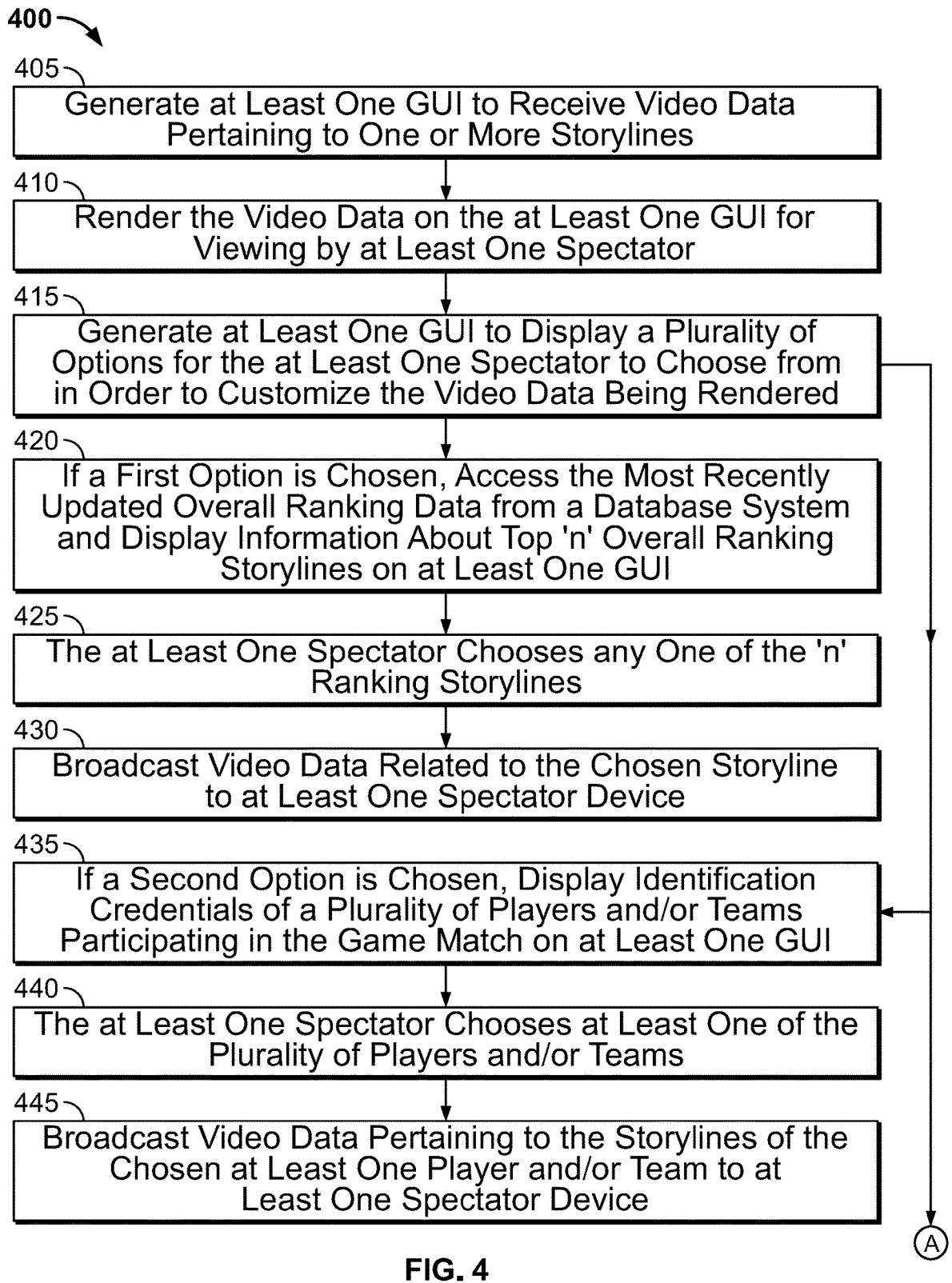
FIG. 4 is a computer-implemented method of enabling at least one spectator to view video data associated with one or more storylines in a game match of a multiplayer video game, in accordance with some embodiments of the present specification.
Figure 4:
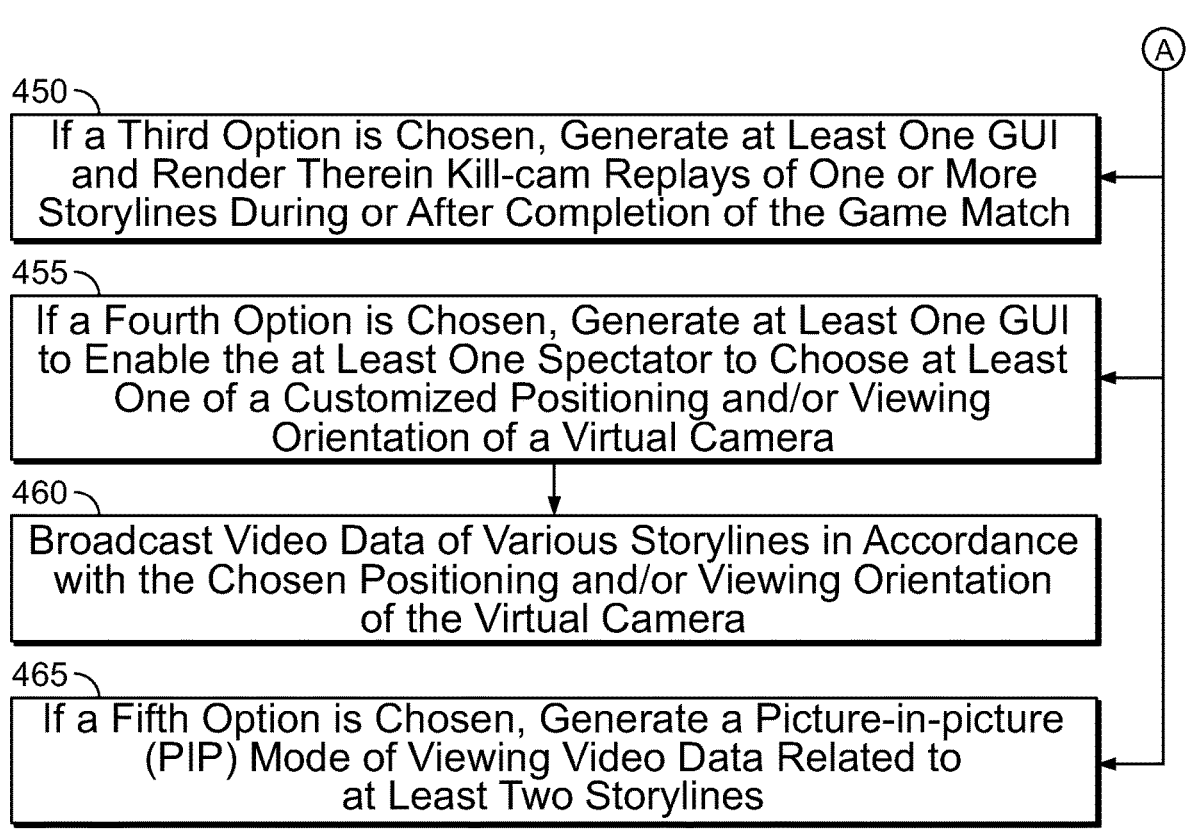

FIG. 4 is a computer-implemented method 400 of enabling at least one spectator to view video data associated with one or more storylines in a game match of a multiplayer video game, in accordance with some embodiments of the present specification. In embodiments, the method 400 is implemented by the storyline engagement module 140 on at least one spectator device 145 corresponding to the at least one spectator. Referring now to FIGS. 1 and 4, at step 405, the module 140 generates at least one GUI to receive video data pertaining to the one or more storylines, broadcasted by the camera intelligence module 135. At step 410, the video data is rendered on the at least one GUI for viewing by the at least one spectator. It should be appreciated that in some embodiments, the received and rendered video data pertains to a default storyline determined, by the camera intelligence module 135, to have a highest overall ranking in the game match (subject to a plurality of rules).

At step 415, upon request by the at least one spectator (such as by clicking an icon on the at least one GUI generated in step 405), the module 140 generates at least one GUI to display a plurality of options for the at least one spectator to choose from in order to customize the video data being rendered.

If the at least one spectator chooses a first option then, at step 420, the module 140 accesses the most recently updated overall ranking data from the database system 150 and displays information about the top 'n' overall ranking storylines on at least one GUI. At step 425, the at least one spectator chooses any one of the 'n' ranking storylines. At step 430, the at least one spectator's choice of the storyline is communicated to the camera intelligence module 135 that, as a result, broadcasts video data related to the chosen storyline to the at least one spectator device.

If the at least one spectator chooses a second option then, at step 435, the module 140 displays identification credentials (such as, for example, names) of a plurality of players and/or teams participating in the game match on at least one GUI. At step 440, the at least one spectator chooses at least one of the plurality of players and/or teams. At step 445, the at least one spectator's choice is communicated to the camera intelligence module 135 that, as a result, broadcasts video data pertaining to the storylines of the chosen at least one player and/or team to the at least one spectator device.

If the at least one spectator chooses a third option then, at step 450, the module 140 generates at least one GUI and renders therein kill-cam replays of one or more storylines during or after completion of the game match.

If the at least one spectator chooses a fourth option then, at step 455, the module 150 generates at least one GUI to enable the at least one spectator to choose at least one of a customized positioning and/or viewing orientation of the virtual camera that records various storylines. At step 460, the at least one spectator's choice(s) is communicated to the camera intelligence module 135 that, as a result, broadcasts video data (to the at least one spectator device) of various storylines in accordance with the chosen positioning and/or viewing orientation of the virtual camera.

If the at least one spectator chooses a fifth option then, at step 465, the module 150 generates a picture-in-picture (PIP) mode of viewing video data related to at least two storylines. In PIP mode, a first video data is displayed on the full GUI screen at the same time as a second video data is displayed in a smaller inset window. In some embodiments, the engagement module 140 enables the at least one spectator to toggle between the first and second video data.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A computer-implemented method of controlling at least one of a navigation, positioning or orientation of a virtual camera configured to capture a plurality of storylines in a multiplayer video game for transmitting to at least one computing device, said method comprising:
    defining, in at least one server remote from the at least one computing device, a function to identify the plurality of storylines;
    defining, in the at least one server, at least one base criterion for ranking each of the plurality of storylines;
    determining, in the at least one server, a base rank for each of the plurality of storylines, wherein the base rank is a function of said at least one base criterion;
    defining, in the at least one server, at least one factor to weight the base rank, said at least one factor having a predetermined value;
    determining, in the at least one server, an overall rank for each of the plurality of storylines by associating said at least one factor with the base rank, wherein the overall rank is determined at a predetermined frequency in the game;
    subject to one or more rules, programmatically moving, in the at least one server, the virtual camera to capture one of the plurality of storylines determined to have a highest overall ranking among the plurality of storylines, wherein the one or more rules limit a time which the virtual camera must take to travel to capture the storyline determined to have the highest overall ranking and wherein the time ranges between 0.25 to 1 second;
    transmitting, from the at least one server to the at least one computing device, the one of the plurality of storylines determined to have a highest overall ranking among the plurality of storylines; and
    causing said one of the plurality of storylines to be rendered on the at least one computing device.

2. The computer-implemented method of claim 1, wherein the function is dependent on at least a genre of said multiplayer video game.

3. The computer-implemented method of claim 1, wherein the at least one server is configured to concurrently transmit to at least 20 computing devices.

4. The computer-implemented method of claim 1, wherein the at least one base criterion comprises a virtual distance of each player with respect to each other player in the multiplayer video game.

5. The computer-implemented method of claim 4, wherein the base rank for each of the plurality of storylines is inversely related to the virtual distances of each player with respect to each of the other players.

6. The computer-implemented method of claim 1, wherein the at least one factor is a function of at least one of:
    a first value representative of a relationship between each player and each other player in the multiplayer video game;
    a second value representative of an orientation of each player relative to each other player in the multiplayer video game; or
    a third factor representative of a degree of an unobstructed view between each player and each other player in the multiplayer video game.

7. The computer-implemented method of claim 1, wherein the one or more rules further limit at least one of rotation, tilt or pan required for the virtual camera to capture the storyline determined to have said highest overall ranking.

8. The computer-implemented method of claim 1, wherein the one or more rules further require the highest overall ranking of the storyline to exceed an overall ranking of an immediately preceding storyline by a predefined value.

9. The computer-implemented method of claim 1, wherein the one or more rules further limit at least one of a speed of movement of the virtual camera or an angular speed of rotation of the virtual camera.

10. A system for controlling at least one of a navigation, positioning or orientation of a virtual camera configured to capture a plurality of storylines in a multiplayer video game executing on a plurality of gaming devices for transmitting to a plurality of spectator devices, said system comprising:
    at least one server for hosting a game session of the multiplayer video game and to transmit said game session to each of a plurality of spectator devices through a network;
    a plurality of gaming modules stored on the plurality of gaming devices remote from the at least one server and configured to enable a plurality of human players to play in the game session of the multiplayer video game;
    a plurality of spectator modules stored on the plurality of spectator devices remote from the at least one server and configured to enable a plurality of human spectators to view the transmission of the game session, wherein at least a portion of the plurality of spectator modules are executing on at least a portion of the plurality of gaming devices and wherein at least a portion of the plurality of gaming modules are executing on at least a portion of the plurality of spectator devices;

a processor in said at least one server, said processor executing a plurality of executable programmatic instructions to:
define a function to identify the plurality of storylines;
define at least one base criterion for ranking each of the plurality of storylines;
determine a base rank for each of the plurality of storylines, wherein the base rank is a function of the at least one base criterion;
define at least one factor to weight the base rank;
determine an overall rank for each of the plurality of storylines by associating the at least one factor with the base rank, wherein a value of the at least one factor has an increasing or decreasing effect on the overall ranking; and
subject to one or more rules, programmatically moving the virtual camera to capture one of the plurality of storylines determined to have a highest overall ranking among the plurality of storylines, wherein the one or more rules limit a time which the virtual camera must take to travel to capture the storyline determined to have the highest overall ranking and wherein the time ranges between 0.25 to 1 second;
transmitting the one of the plurality of storylines determined to have a highest overall ranking among the plurality of storylines to the plurality of spectator modules; and
causing said one of the plurality of storylines to be rendered on the at least one computing device.

11. The system of claim 10, wherein the at least one base criterion comprises a virtual distance of each player with respect to each other player participating in the game session.

12. The system of claim 11, wherein the base rank for each of the plurality of storylines is inversely related to the virtual distances of each player with respect to each other player.

13. The system of claim 10, wherein the at least one factor comprises at least one of:
a first value representative of a relationship between each player with respect to each other player in the game session;
a second value representative of an orientation of each player with respect to each other player in the game session; and
a third value representative of a degree of an unobstructed view between each player and each other player in the game session.

14. The system of claim 10, wherein the one or more rules further limit at least one of rotation, tilt or pan required for the virtual camera to capture the storyline determined to have the highest overall ranking.

15. The system of claim 10, wherein the one or more rules further require the highest overall ranking of the storyline to exceed an overall ranking of an immediately preceding storyline by a predefined value.

16. The system of claim 10, wherein the one or more rules further limit at least one of a speed of movement of the virtual camera or an angular speed of rotation of the virtual camera.

17. A computer readable non-transitory medium comprising a plurality of executable programmatic instructions wherein, when said plurality of executable programmatic instructions are executed by a processor in at least one server, a process for controlling navigation, positioning and orientation of a virtual camera configured to capture a plurality of storylines in a multiplayer video game for transmitting to at least one spectator device, said plurality of executable programmatic instructions comprising:
programmatic instructions, stored in said computer readable non-transitory medium, for determining a base rank for each of said plurality of storylines, wherein the base rank is a function of at least one base criterion;
programmatic instructions, stored in said computer readable non-transitory medium, for determining an overall rank for each of said plurality of storylines by associating at least one weighting factor with said base rank, wherein said overall rank is determined at a predetermined frequency in the game, and wherein said weighting factor has an accentuating or diminishing effect on the overall rank; and
programmatic instructions, stored in said computer readable non-transitory medium, for switching the virtual camera to a second storyline of a second overall rank from a first storyline of a first overall rank, wherein said switching is subject to one or more rules and wherein the one or more rules limit a time which the virtual camera must take to travel to capture the storyline determined to have the highest overall ranking and wherein the time ranges between 0.25 to 1 second; and
programmatic instructions, stored in said computer readable non-transitory medium, for causing said one of the plurality of storylines to be rendered on the at least one computing device.

18. The computer readable non-transitory medium of claim 17, wherein the at least one base criterion is a distance of each player with respect to every other player participating in a game match of said multiplayer video game, and wherein the base rank for each of the plurality of storylines is inversely related to the distance of each player with respect to every other player.

* * * * *